Figure 1:
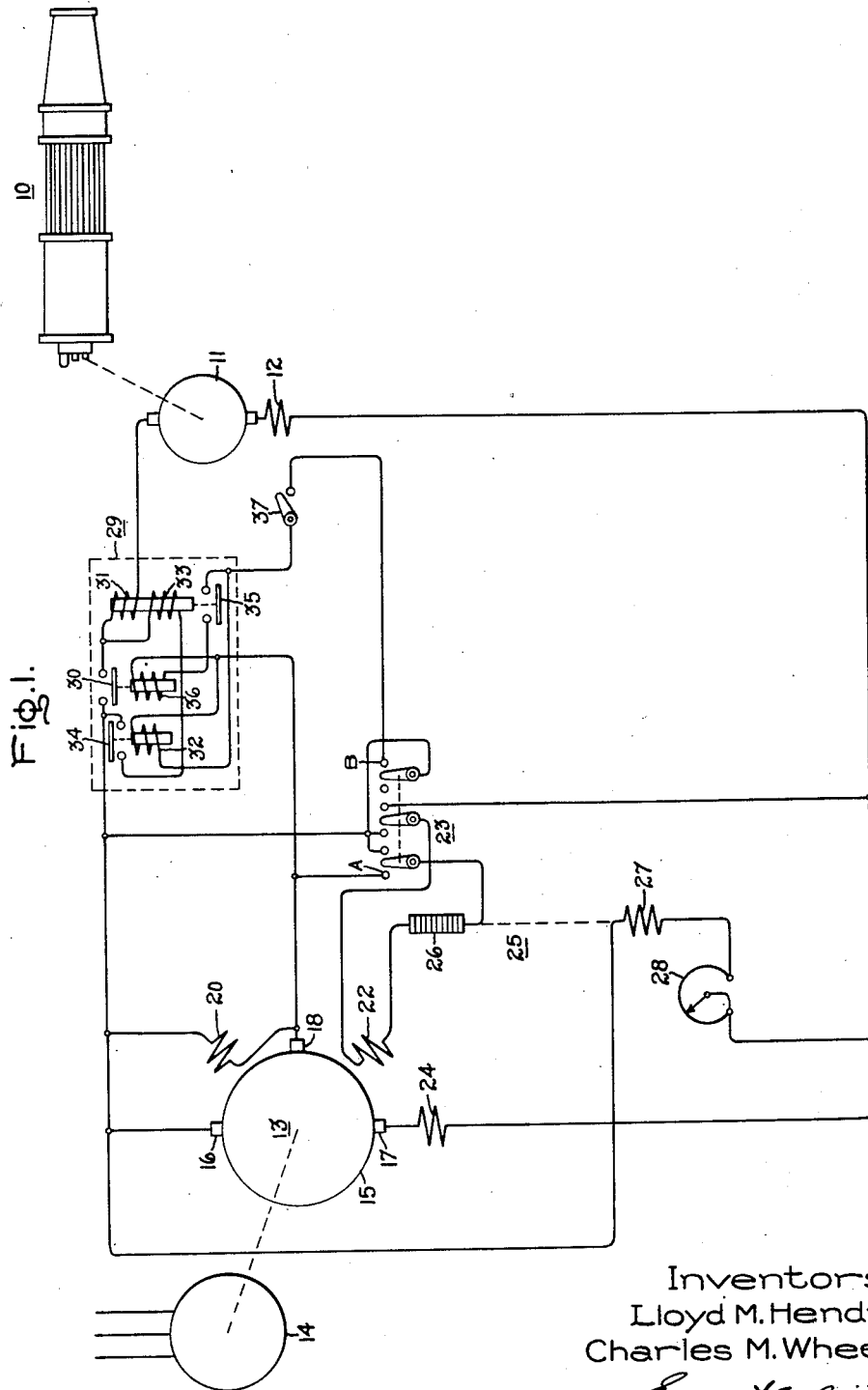

April 8, 1952 — L. M. HENDRICK ET AL — 2,592,522
DYNAMOELECTRIC MACHINE AND CONTROL
Filed Jan. 12, 1950 — 3 Sheets-Sheet 1

Inventors:
Lloyd M. Hendrick,
Charles M. Wheeler,
by Ernest C. Britton
Their Attorney.

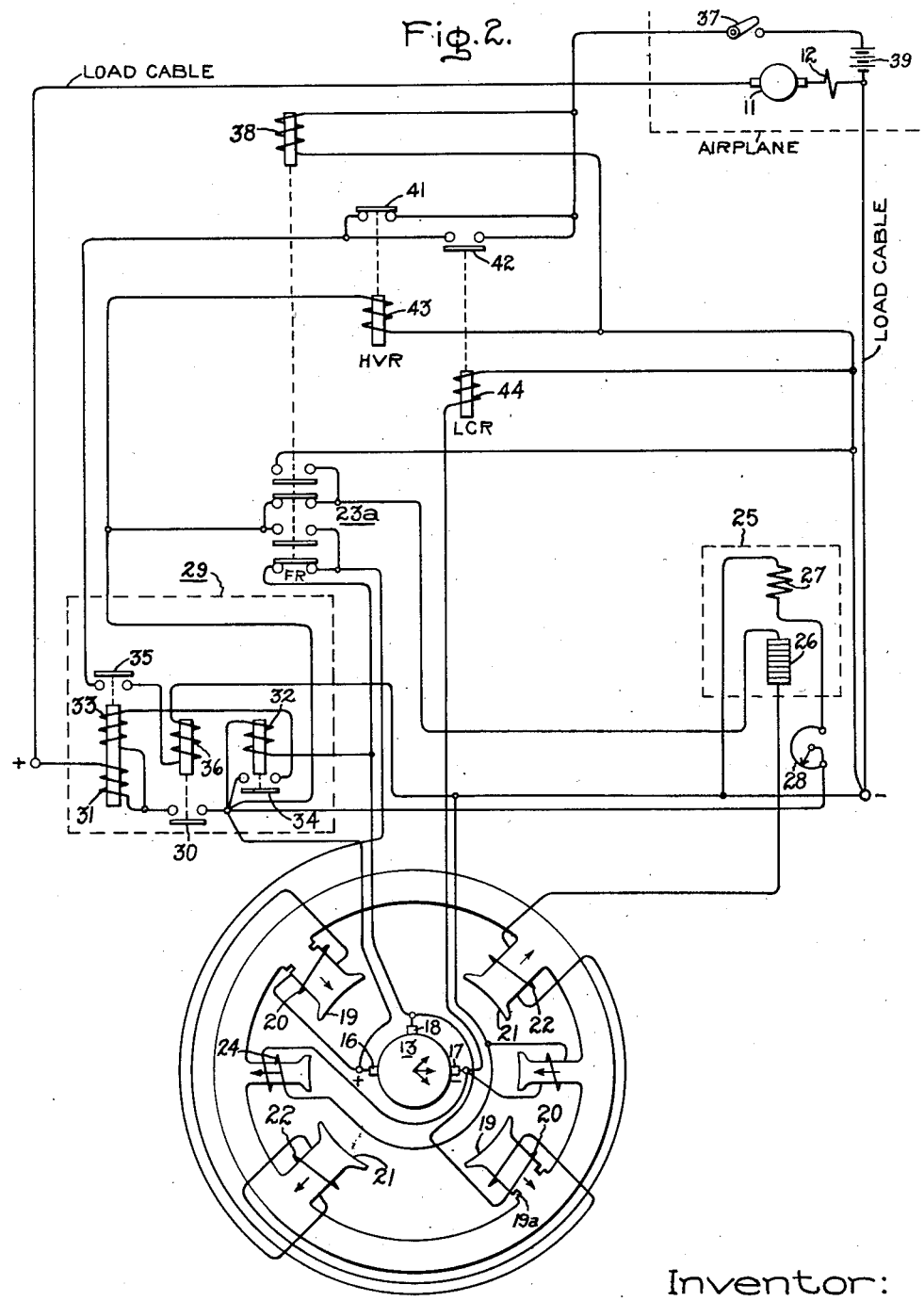

April 8, 1952   L. M. HENDRICK ET AL   2,592,522
DYNAMOELECTRIC MACHINE AND CONTROL
Filed Jan. 12, 1950   3 Sheets-Sheet 3
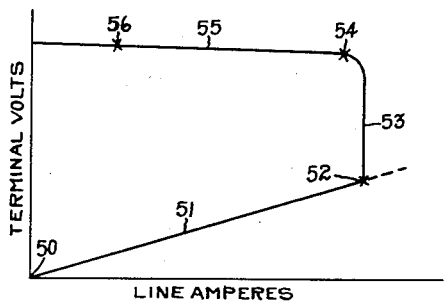
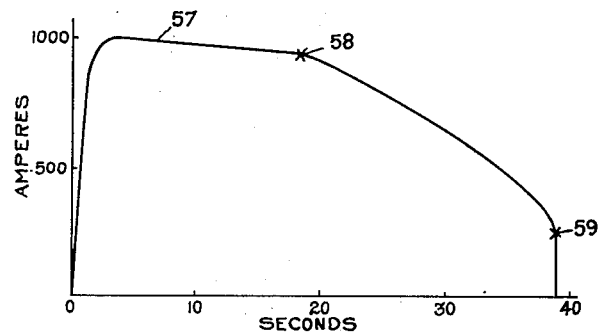
Inventors:
Lloyd M. Hendrick,
Charles M. Wheeler,
by Ernest H. Britton
Their Attorney.

Patented Apr. 8, 1952

2,592,522

UNITED STATES PATENT OFFICE 2,592,522

DYNAMOELECTRIC MACHINE AND CONTROL

Lloyd M. Hendrick and Charles M. Wheeler, Fitchburg, Mass., assignors to General Electric Company, a corporation of New York Application January 12, 1950, Serial No. 138,152

7 Claims. (Cl. 322—53)

Our invention relates to electrical equipment and control and more particularly to generators provided with means to adapt the same to supply constant current (such as to motors) over a limited voltage range. The invention is believed to have particular significance in connection with so-called "aircraft energizers," or other apparatus adapted to supply electrical energy to lightweight equipment such as an aircraft engine starter motor.

It has previously been known to supply a constant current power supply characteristic for starting jet or other type aircraft engines, with the consequent advantage of a high ratio of starter motor power to starter motor weight. The necessary thermal capacity or size of a motor is dependent upon current values during the starting cycle, and the size of current carrying elements (including brushes and commutator, if any), of a motor are also dependent primarily upon the peak value of current obtained during the starting cycle. Therefore, from the standpoint of motor weight alone, it is doubly beneficial to eliminate the current peaks which would be caused during the starting cycle if a motor were to be placed across a constant voltage source or if ordinary time or current responsive starting control were used. Furthermore, the weight of the mechanical connection between any motor and the device it drives, is determined largely by shocks apt to be encountered during starting and if such shocks can be modified by eliminating high peaks of current (i. e., torque), the equipment may be made lighter which is of special importance if the motor and its driving connection are to be airborne. Heretofore, it has been known to supply constant current by the use of a current regulator together with the use of a separate exciter machine but such means are costly and introduce complicated maintenance problems. It has also been previously known to start a generator from zero voltage by the use of armature short circuiting contacts, but this is likewise expensive and often causes excessive and even destructive heating in the generator and in the contacts.

It is an object of the present invention to provide simple and inexpensive means for overcoming the above-mentioned difficulties.

A further object of the present invention is to provide a self-excited dynamoelectric machine affording zero to constant current regulation.

A still further object of the invention is to provide electrical equipment capable of sequentially providing first zero power, second, linearly increasing power, third, power having a constant current characteristic, fourth, power having a constant voltage characteristic, fifth, zero power after a predetermined low current cut off.

Another object of the present invention is to provide a novel combination of constant current generator and control therefor to make the same useful as a non-airborne aircraft energizer, although the same generator-control combination may have other uses such as to supply constant current for battery charging.

Broadly, the means employed in the embodiments herein illustrated and described comprise a generator of split pole design and having a main field exciting winding and a cross or regulating field exciting winding together with control means for starting at zero voltage by having the cross field reversed with respect to the main field and thereafter transposing the cross field to allow a voltage built up until an inherent constant current characteristic of the machine is reached, thereby to eliminate heavy inrush currents to the electric device thereby supplied and also minimize strains and shocks on mechanical parts associated with such device.

Other objects and advantages will become apparent and our invention will be better understood by consideration of the following description taken in connection with the accompanying drawing in which Fig. 1 represents a simplified schematic diagram of a power system including a jet aircraft engine, an airborne electric starter motor therefor, and a ground based power supply for the starter with said supply comprising an alternating current motor, a D.-C. generator and certain hereinafter described control for the generator; Fig. 2 is a simplified connection diagram for the generator shown in Fig. 1 but with a modification in the control thereof; Fig. 3 is a volt ampere characteristic curve for a system of the type shown in Figs. 1 and 2; and Fig. 4 is a typical time current characteristic for the same system.

Referring now to Fig. 1, 10 is an aircraft jet engine adapted to be driven by a D.-C. starter motor having an armature 11 and a series field winding 12. Because of the tremendous rotational inertia of an engine of the jet type, the starter motor (11—12) is of necessity of rather large size (for example 60 H. P.). In order to reduce weight on the aircraft, such large starter motors are customarily energized from a ground (or aircraft carrier borne) power supply and in the illustrated embodiment this power supply comprises a D.-C. generator 13 adapted to be driven by an A. C. motor 14, although, if desired, the generator may be driven by any convenient source of mechanical power such as an automobile type engine. The generator 13 (shown in Figs. 1 and 2) is a modification of the split pole type generator described and claimed in U. S. Patent 1,340,004, issued May 11, 1920 on an application filed by Sven R. Bergman, and assigned to the assignee of the present invention. In accordance with the teachings of the patent, the generator is provided with an armature and a commutator diagrammatically represented by the circle 15, and the commutator is contacted by load brushes 16 and 17 and an auxiliary or third brush 18. As shown in Fig. 2, the field magnet structure has two sets of field poles 19 and 21. As explained in the Bergman patent one of said sets of poles (19) is arranged to be substantially saturated (so that the flux in said set is practically unaffected by armature reaction when the set is excited by current in a shunt field exciting winding 20 wound thereon and connected between the auxiliary brush 18 and load brush 16). The poles 19 may be referred to as the main poles and if desired, the saturation may be achieved by cutting saturating notches 19a (Fig. 2) in these poles. The poles 21 of the other set may be referred to as the cross poles. In the Bergman patent the cross poles are arranged to operate unsaturated (so as to be affected by armature reaction). In the present invention the cross poles 21 are provided with a shunt field exciting winding 22 connected through means (such as a three pole double throw switch 23 as in Fig. 1 or a relay 23a as in Fig. 2) for selectively connecting the winding across brushes 16 and 18 or across load brushes 16 and 17. During operation, main poles 19 are saturated and the flux therein will not vary with load and the voltage across brushes 16 and 18 will remain constant. However, the cross poles 21 having the flux varied by current in winding 22 (dependent on terminal volts for one position of the reversing device) are unsaturated to the extent that the total flux through these poles is (for this position of the reversing device) by predetermined design caused to reverse at a specific value of load current due to the effect of armature reaction being greater than the flux caused by winding 22 at this specific value of load current. The winding 22 is so connected that when the switch 23 (of Fig. 1) is in position A, the voltage produced between brushes 17 and 18 (from winding 22) opposes the voltage between brushes 18 and 16 (from winding 20) and the output voltage of the machine will be zero since the load voltage is equal to the algebraic sum of the two voltages, one across brushes 16 and 18 and the other across brushes 17 and 18, and with switch 23 in position A these two voltages are (with proper design of the machine) equal and opposite. When the switch 21 is subsequently thrown to position B the field winding 22 is connected across brushes 16 and 17 in such direction that it opposes the armature reaction component effective in its own axis, so that the flux in the associated poles (21 or Fig. 2) tends to be varied by the armature reaction and the voltage between brushes 17 and 18 (and consequently the voltage across the load brushes 16 and 18) decreases when the load current increases.

If desired, in order to obtain desirable commutation, a commutating pole winding 24 may be connected in series with the armature as shown.

The main field winding 20 is permanently connected across one main brush and the auxiliary brush and the switching means indicated generally at 23 (or 23a) are provided so that the cross field winding 22 may be first connected across the same main brush and auxiliary brush 18 of the generator to obtain zero voltage due to the opposing effects of the fields. This allows the cross field to be reconnected for a "soft start" (as hereinafter explained) as it is subsequently connected across the same main brush and the other main brush of the generator to eventually obtain constant current regulation. If desired, additional advantageous results may be secured if a voltage regulator indicated generally at 25 is included in the cross field circuit to regulate the generator output voltage to a maximum preset value (such as 28½ volts) without disadvantageously affecting constant current regulation. Regulator 25 may be of the conventional carbon pile type having a carbon pile resistance element 26 adapted to be compressed or decompressed by a solenoid coil 27 arranged in series with an adjusting rheostat 28. Coil 27 and rheostat 28 are placed across the load brushes to be responsive to the output of the machine, and the carbon pile 26 is placed in series with the cross or regulating field winding 22 and the combination has an amplifying effect inasmuch as the regulating excitation need be only a small fraction of the total excitation of the split pole generator.

In order to prevent the motor 11 from feeding back into the generator, an automatic cut-out or reverse current relay 29 is provided and in the illustrated embodiments of Figs. 1 and 2, this relay serves the added purpose of acting as a line contactor in the generator output or loop circuit between motor and generator. Relay 29 is of conventional type having a main contact 30, a reverse current series coil 31, a voltage relay coil 32 (to prevent the main contact being closed before the generator has been brought up to speed), a differential voltage coil 33 (to prevent the main contacts closing except with proper polarity), voltage relay contact 34 (closed when coil 32 is energized) arranged in series with coil 33 across the initially open main contacts 30. The series coil 31 and differential voltage coil 33 are arranged on the core of a relay having a normally open contact 35 which when closed energizes the main contactor coil 36 closing contacts 30 to connect the generator to its load. There is also a starter switch 37 (which may conveniently be located on the aircraft itself so that the pilot will have some control of the starting cycle). As shown in Fig. 1, the relay 29 is adapted to be energized to close line contact 30 as soon as switch 23 is thrown to the B position whenever starter switch 37 is closed.

Further advantageous results may be obtained by the use of high voltage low current cut-off control such as that shown in Fig. 2. In Fig. 2, the starting is remotely controlled since the reversing relay 23a has a coil 38 adapted to be energized as by a battery 39 when the pilot's switch 37 is closed to energize reverse current relay 29. However, as illustrated in Fig. 2, the circuit to relay 29 must be completed either through a normally closed contact 41 on a high voltage relay HVR or through a normally open contact 42 on a low current relay LCR. High voltage relay HVR has a coil 43 connected to be responsive to output voltage as by being connected across the generator output brushes, and low current relay LCR has a coil 44 which is connected to be responsive to output current as by being connected across the commutating field 24 to be responsive to voltage drop thereacross.

The characteristics of the arrangement described are shown in Figs. 3 and 4. Fig. 3 illustrates generator output characteristic with a load assumed by way of example to be an aircraft jet engine direct coupled starter. When a zero voltage ("soft start") sequence is initiated, current and voltage build up rapidly from origin 50 along a resistance line 51 (dependent upon stalled motor and lead resistance) to a point 52, at or near which point the starter motor commences to crank. The starter accelerates the engine at constant current along a line 53 and after the engine fires and begins to furnish some torque itself current is reduced to a point 54 where the voltage regulator is able to take control so that the characteristic follows a constant voltage line 55. At a point 56 the current is cut off either manually or by some automatic means (such as by the HVR, LCR and reverse current relay combination shown in Fig. 2 and further described hereinafter in connection with Fig. 4). Beyond this point 56 the jet engine has enough torque to sustain itself.

Fig. 4 illustrates a "soft start" characteristic 57 of an energizer based on actual field tests (in normal winter conditions in northern United States) upon an airplane having a large jet engine. Although current input to the starter motor rises rapidly during the first second, the inherent current limiting feature of the generator causes the current to level off at 1,000 amperes. In less than twenty seconds the engine is sufficiently accelerated that the current is caused to gradually diminish. Firing speed of 800 R. P. M. is represented at a point 58 and thereafter the engine torque combines with the starter torque, and the starter current begins to diminish more rapidly. At a predetermined low current cut off point 59, the energizer is disconnected from the starter motor by means such as that indicated diagrammatically in Fig. 2, as contact 42 of LCR which at low current opens and interrupts voltage supplied to coils 32 and 36 (relay 29) since HVR is energized. During the initial starting cycle, however, the voltage output of the generator is low so that HVR is dropped out (contact 41 closed) and the low current relay has no effect upon the control.

In operation, when the pilot closes his starting switch 37, the following sequence is initiated:

1. FR relay 23a coil 38 is energized and reconnects the cross field allowing the armature voltage to build up from the substantially zero voltage previously caused, as hereinabove explained, and, at the same time, the reverse current relay 29 becomes energized and its main contacts 30 close connecting the generator to the starter motor.

2. The current will then increase along the resistance line 51 (Fig. 3) to the point 52, but before point 52 is reached LCR relay coil 44 (Fig. 2) becomes energized.

3. Thereafter, HVR relay coil 43 (which is connected across the output brushes) becomes energized opening contact 41.

4. When the loop circuit current decreases (due to back E. M. F. of the starting motor) to a predetermined value, LCR becomes de-energized and disconnects the energizer from the starting motor.

5. When the switch 37 is subsequently opened or when the load cable leads are disconnected from the aircraft, FR relay coil 38 is de-energized allowing the cross field to reverse and bring the generator voltage back to zero in readiness for the next start.

With the arrangement as above described, the generator supplies both regulated voltage with variable current and approximately constant current with variable voltage with the latter characteristic controlled inherently by the generator design. Insofar as aircraft engine starting is concerned, this permits avoiding high peaks of starting current (such as those caused when constant or adjustable sources of voltage are used) and consequent overheating of the starter motor and shocks on the mechanical connections between the starter and the jet engine. Thus, with the invention the starting motor and its connections with the engine may be made smaller and the payload of the aircraft may be made larger.

While we have illustrated and described particular embodiments of our invention, modifications thereof will occur to those skilled in the art. We desire it to be understood, therefore, that our invention is not to be limited to the particular arrangements disclosed, and we intend in the appended claims to cover all modifications which do not depart from the spirit and scope of our invention.

What we claim as new and desire to secure by Letters Patent of the United States is:

1. Current supply means for a load comprising in combination a direct current generator having two load brushes and an auxiliary brush located therebetween and having two field exciting windings, means including connections for selectively first energizing said field exciting windings differentially from one of said load brushes and said auxiliary brush so that the net voltage output across said load brushes is substantially zero and secondly energizing one of said field exciting windings from one of said load brushes and said auxiliary brush and the other of said field exciting windings from said load brushes so that the energization of said second winding will be initially zero for said second condition and the voltage output at said load brushes may gradually build up from said zero value as determined by the excitation of said windings and the effect of armature reaction.

2. Current supply means comprising in combination a direct current generator having two field exciting windings, control means for first energizing said field exciting windings so that the net voltage output of said generator is substantially zero, control means for secondly energizing one of said field exciting windings from said net voltage output so that for said second condition the field excitation will initially be only that produced by the other of said field exciting windings.

3. A dynamoelectric machine having an armature provided with a commutator, load brushes and an auxiliarly brush bearing on said commutator, a field magnetic structure having two sets of field poles, field exciting windings on said poles with the poles and windings arranged so that one of said sets of poles is substantially saturated so that the flux in said set is unaffected by armature reaction and produces a constant voltage between said auxiliary brush and one of said load brushes and the other of said sets is substantially unsaturated so that the flux therein is varied by armature reaction and the voltage produced by said set and consequently the voltage across the load brushes decreases at a sharp rate when the load current increases beyond a predetermined value, with said exciting winding for said saturated poles connected between said auxiliary brush and one of said load brushes, and the exciting winding for said unsaturated poles adapted to be connected selectively first across said auxiliary brush and said one load brush but opposing the winding on said saturated poles and second across said load brushes to set up flux in said unsaturated poles in the proper direction to oppose the component therein of flux produced by armature reaction.

4. A dynamoelectric machine having an $n$ pole armature winding, a field structure comprising $2n$ mechanical field pole pieces arranged in two sets with an equal number of pole pieces in each set, means for providing a substantially magnetically saturated path in the magnetic circuit of one of said sets of pole pieces so that the flux in said set is substantially unaffected by armature reaction, the magnetic circuit of the other of said sets of pole pieces and the electrical circuits associated therewith being arranged so that the flux therein may be substantially varied by armature reaction, load brushes and an auxiliary brush co-operating with said armature winding, said load brushes being arranged with respect to said pole pieces so that the voltage difference between said brushes is dependent on the flux in both of said sets of pole pieces, said auxiliary brush being arranged with respect to said pole pieces so that the voltage between said auxiliary brush and one of said load brushes is dependent on the flux in said magnetically saturated set of pole pieces with a consequent constant voltage across said brushes, a shunt field exciting winding on said saturated set of pole pieces connected across said brushes having constant voltage thereacross, a shunt field exciting winding on said unsaturated set of pole pieces, a reversing device connected to said last mentioned exciting winding, connections from said reversing device to said brushes having constant voltage thereacross to allow said last mentioned winding to produce a voltage across said auxiliary brush and the corresponding one of said load brushes equal to but opposing said constant voltage, and connections from said reversing device to both of said load brushes to allow said last mentioned winding to produce a flux opposing the armature reaction component in the same axis, thereby to selectively allow zero output and desired current output from said dynamoelectric machine to provide a "soft start" to any apparatus adapted to be supplied therefrom.

5. A generator having a $n$ pole armature winding, a field structure comprising $2n$ mechanical field pole pieces having windings and arranged in two sets with an equal number of pole pieces in each set, means for providing a substantially magnetically saturated path in the magnetic circuit of one of said sets of pole pieces so that the flux in said set is substantially unaffected by armature reaction, the magnetic circuit of the other of said sets of pole pieces and the electrical circuits of windings thereon being arranged to operate unsaturated so that the flux therein may be substantially varied by armature reaction, load brushes and an auxiliary brush co-operating with said armature winding, said load brushes being arranged with respect to said pole pieces so that the voltage difference between said brushes is dependent on the flux in both of said sets of pole pieces, said auxiliary brush being arranged with respect to said pole pieces so that the voltage between said auxiliary brush and one of said load brushes is dependent on the flux in said magnetically saturated set of pole pieces with a consequent constant voltage across said brushes, said pole piece windings including a shunt field exciting winding on said saturated set of pole pieces connected across said brushes having constant voltage thereacross, a shunt field exciting winding on said unsaturated set of pole pieces, a reversing relay having positionable contacts, connections from said last mentioned field exciting winding through said contacts in one position thereof to said brushes having constant voltage thereacross to allow said last mentioned winding to produce a voltage across said auxiliary brush and the other of said load brushes equal to but opposing said constant voltage, connections from said last mentioned winding through said contacts in another position thereof to both of said load brushes to allow said last mentioned winding to produce a flux opposing the armature reaction component in the same axis, a voltage regulator having its operating element connected across the output of said generator and its regulated element interposed between said last mentioned existing winding and said reversing relay contacts, an operating coil for said reversing relay, means including a source of control power and circuit making means in series circuit therewith for energizing said reversing relay coil, said circuit making means including a second relay having a contact closed when said second relay is deenergized and including a third relay in parallel circuit having a contact open when said third relay is deenergized, connections for energizing the operating element of said second relay in response to a predetermined high voltage across the output of said generator, connections for energizing the operating element of said third relay in response to a predetermined high current value in the output circuit of said generator and connections placing said second and third relay contacts in parallel with each other and in series with said circuit making means in series with said source of control power and said reversing relay coil.

6. Apparatus adapted to supply electrical energy to a load comprising electrical equipment having a high ratio of power to weight, said apparatus including a D. C. generator, means for driving said generator, and electrical control, said generator being a split-pole generator of the constant current type having load brushes and a third brush and adapted to be operated with saturated main poles and unsaturated cross poles and having a winding on said cross poles, and said electrical control including means for first energizing said cross pole winding first from one load brush and said third brush to provide zero output from said machine and secondly from said load brushes to provide a soft start before the constant current output characteristic of said machine is reached.

7. Apparatus adapted to supply electrical energy to a load comprising electrical equipment having a high ratio of power to weight, said apparatus including a D. C. generator, means for driving said generator and electrical control, said generator being a split pole generator of the constant current type having two load brushes and a third brush and adapted to be operated with saturated main poles and unsaturated cross poles and having a winding on said cross poles, said electrical control including means for first energizing said cross pole winding first from one load brush and said third brush to provide zero output from said machine and secondly from said load brushes to provide a soft start before the constant current output from said machine is reached, said control including a voltage regulator arranged responsive to voltage across said load brushes and connected to vary the cross field winding energization above a predetermined high voltage value, and said control including relay means arranged to connect said apparatus first with said zero output to said load responsive to supervisory control, and finally to disconnect said apparatus from said load and simultaneously again arrange to energize said cross pole winding for zero output upon the simultaneous occurrence of said high voltage value and a predetermined low value of current through said load.

LLOYD M. HENDRICK.
CHARLES M. WHEELER.

REFERENCES CITED

The following references are of record in the file of this patent:

UNITED STATES PATENTS

| Number | Name | Date |
|---|---|---|
| Re. 18,516 | Beetem | July 12, 1932 |
| 1,000,776 | Burnham | Aug. 15, 1911 |
| 1,340,004 | Bergman | May 11, 1920 |
| 1,340,005 | Bergman | May 11, 1920 |
| 1,426,924 | Steck | Aug. 22, 1922 |
| 1,578,915 | Perkins | Mar. 30, 1926 |
| 1,659,106 | Hillebrand | Feb. 11, 1928 |